March 21, 1939. C. A. RUDOLPH ET AL 2,151,050
VALVE
Filed Dec. 24, 1934 2 Sheets-Sheet 1

Inventors
Chester A. Rudolph
Edwin C. McCutcheon
By their Attorney
George H. Fisher

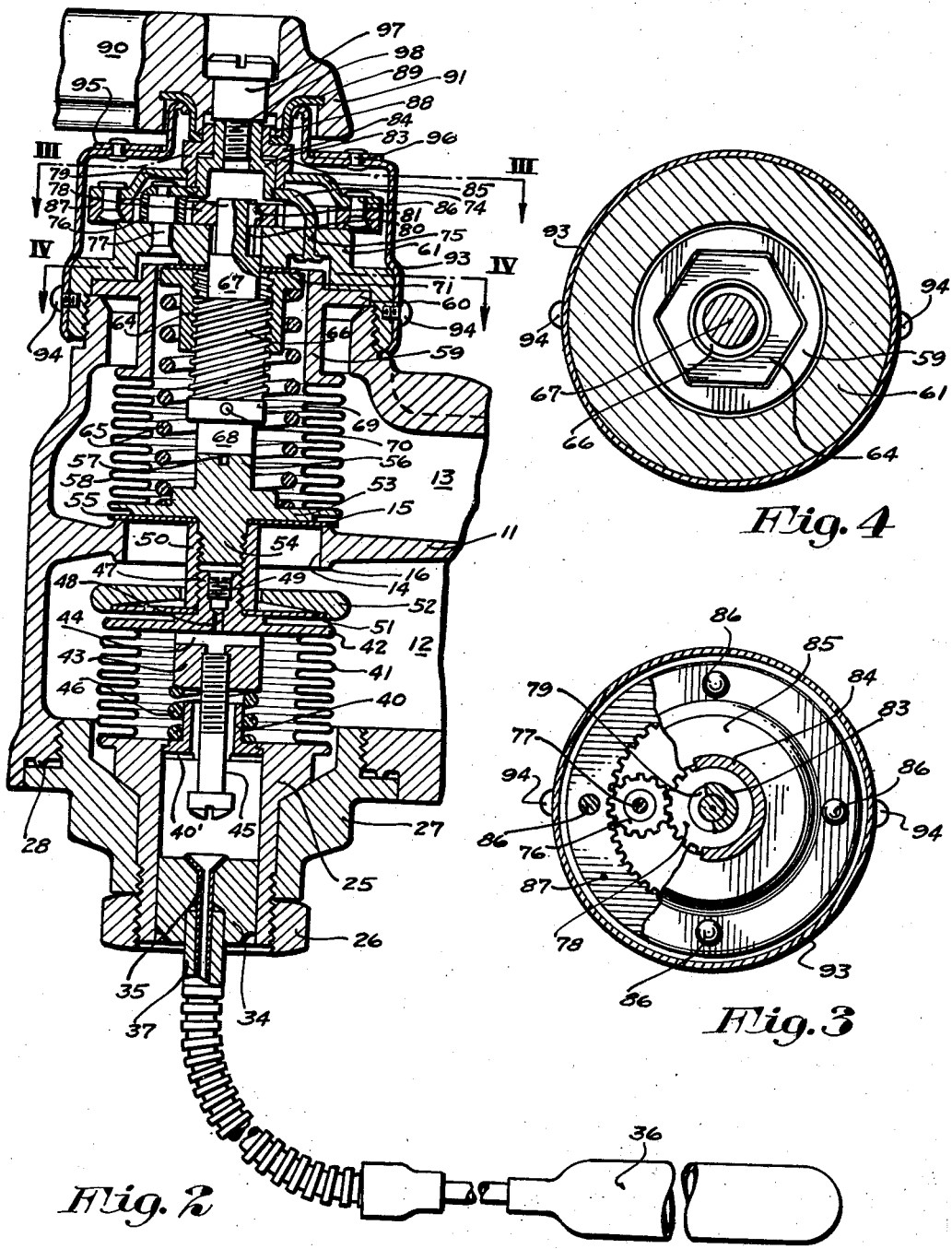

Patented Mar. 21, 1939

2,151,050

UNITED STATES PATENT OFFICE 2,151,050

VALVE

Chester A. Rudolph and Edwin C. McCutcheon, Minneapolis, Minn., assignors to Minneapolis-Honeywell Regulator Company, Minneapolis, Minn., a corporation of Delaware Application December 24, 1934, Serial No. 758,969

16 Claims. (Cl. 236—42)

This invention relates to valves and more particularly to those types of valves that are capable of automatic and manual operation.

An object of this invention is to provide a valve of the character described wherein a single means is provided for regulating the automatic operation of the valve and to move the valve to open and closed positions.

Another object is to provide a novel valve structure cooperable with associated valve seats wherein a condition responsive device moves the valve structure in one direction to engage one of the seats and wherein the valve structure is manually moved in an opposite direction to engage the other seat.

A further object is to provide a valve structure cooperable with associated valve seats wherein the valve structure is moved towards one of the seats by a condition responsive device against the action of an adjustable biasing means and wherein manual means are provided for adjusting the biasing means and for moving the valve towards the other seat.

A still further object is to provide a novel control device for adjusting a biasing mechanism and for moving a valve.

Another object is to provide a balancing means for a valve of the character described wherein the effect of both the inlet and outlet pressures acting on the valve are completely balanced.

Other objects and advantages will become apparent to those skilled in the art upon reference to the accompanying specification, claims and drawings in which:

Fig. 2 is a vertical sectional view similar to that of Fig. 1 but showing the parts in a different position and also showing a modified form of the temperature responsive device;

Fig. 3 is a horizontal sectional view taken substantially on the line III—III of Fig. 2;

Fig. 4 is a horizontal sectional view taken substantially on the line IV—IV of Fig. 2;

Figures 1, 5:
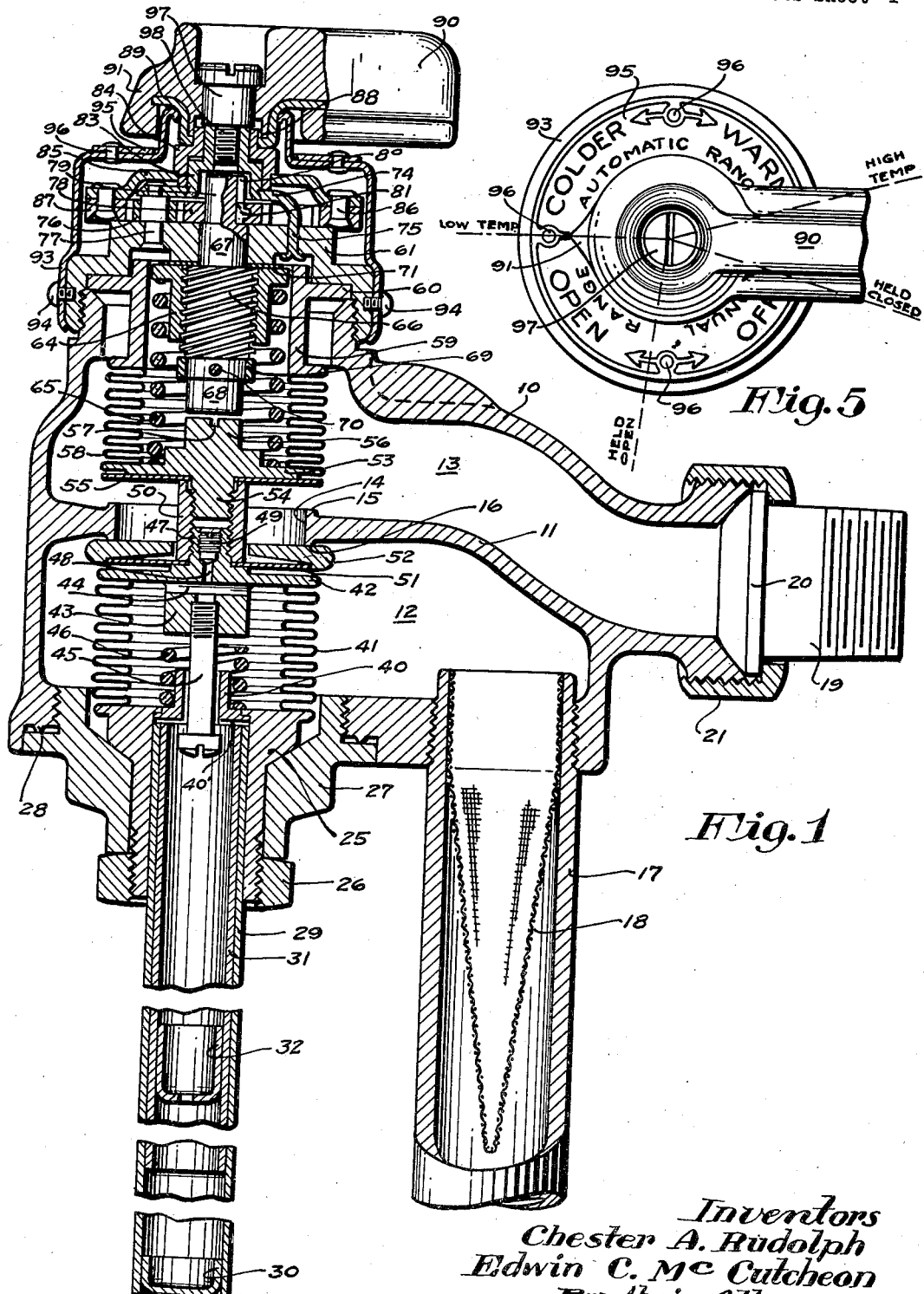
Fig. 1 is a vertical sectional view of the valve of our invention.
Fig. 5 is a plan view of a portion of the valve of this invention.

The valve comprises a casing 10 having a transverse partition 11 therein which divides the inner portion of the casing 10 into a lower inlet chamber 12 and an upper outlet chamber 13. The transverse partition 11 is provided with a port opening 14 to establish communication between the inlet chamber 12 and the outlet chamber 13. Located adjacent the upper extremity of the port opening 14 is an annular seat 15 and located adjacent the lower extremity of the port opening 14 is another annular seat 16.

The bottom portion of the casing 10 is provided with an opening in communication with the inlet chamber 12 and in this opening is screw-threaded a pipe 17 providing a means for supplying fluid to the valve. The pipe 17 is preferably provided with a screen 18 to prevent foreign matter from getting into the valve and impeding the operation thereof. The casing 10 is laterally provided with an opening which is in communication with the outlet chamber 13 and a pipe 19 provided with a flange 20 is adapted to engage in this opening to provide means for conveying fluid out of the valve. A flanged coupling 21 which engages the flange 20 of the pipe 19 is screw-threaded on to the casing 10 to form a fluid-tight seal between the pipe 19 and the casing 10.

A flanged member 25 having a longitudinal passage therethrough is secured in and held in fluid-tight relationship with a collar member 27 by means of a nut 26 being screw-threaded on the flanged member 25. The collar member 27 is in turn screw-threaded into the lower portion of the casing 10 and a fluid-tight joint is afforded in this connection by means of the annular seat 28 integral with the casing 10 engaging the collar member 27.

Referring now to Fig. 1, a tube 29 is pressed and soldered into the flanged member 25 and the lower portion of the tube is closed in a fluid-tight manner by means of a cap 30 soldered in the tube 29. A reinforcing tube 31 is rigidly secured within the tube 29 and a baffle member 32 having a restricted opening therein is in turn rigidly secured in the reinforcing tube 31. The tube 29 is adapted to receive a charge of volatile fluid in the manner to be pointed out hereinafter.

Referring now to Fig. 2, a different type of temperature responsive device is shown and comprises a plug 34 which is rigidly secured in a fluid-tight manner in the flanged member 25. The plug 34 has an opening therein for receiving the end of a capillary tube 35, the other end of the capillary tube 35 being secured to a volatile fluid bulb 36 in a manner which is old in the art. A protective tubing 37 surrounding the capillary tube 35 is also rigidly secured in the plug member 34. The bulb 36 is adapted to receive a charge of volatile fluid in a manner to be pointed out hereinafter.

Secured to the upper end of the flanged member 25 in coaxial alignment with the tube 29 of Fig. 1 or the plug 34 of Fig. 2 is a guide member 40, having an opening therethrough and radially extending notches 40' therein. Also secured in a fluid-tight manner to the upper portion of the flanged member 25 is one end of a bellows 41. The other end of the bellows 41 is secured in a fluid-tight manner to a movable enclosure member 42. The movable enclosure member 42 has a downwardly extending boss 43 with horizontal passages 44 located therein. An abutment screw 45 having an enlarged head is screw-threaded into the lower portion of the boss 43. A spring 46 surrounds the guide 40 and is adapted at certain times to engage the boss 43 of the movable enclosure member 42. The movable enclosure member 42 is also provided with an upwardly extending boss 47 which has a vertical passage 48 in engagement with the horizontal passages 44. The vertical passage 48 of the upper boss 47 is provided with a removable screw plug 49.

By removing the removable plug 49, a charge of suitable volatile fluid may be inserted in the vertical passage 48 and may flow through the horizontal passages 44 into the bellows 41 and down through the guide 40 into the tube 29 of Fig. 1 or into the volatile fluid bulb 36 of Fig. 2. When the charge of volatile fluid has been inserted in the manner described immediately above, the plug 49 is inserted in the passage 48 to seal the same. Upon an increase in temperature acting on the tube 29 or the volatile fluid bulb 36, the volatile fluid contained therein will volatilize and cause expansion of the bellows 41 and consequent upward movement of the movable enclosure member 42. A decrease in temperature acting on the tube 29 or on the volatile fluid bulb 36 will cause condensation of the volatile fluid contained therein to permit contraction of the bellows 41 and consequent lowering of the movable enclosure member 42. In case the enlarged head of the abutment screw 45 should engage the guide 40, passage of volatile fluid through the guide 40 will be permitted by the radial slots 40' located in the lower extremity of the guide 40. Although we have disclosed a condition responsive means in the form of a temperature responsive means utilizing a volatile fluid for moving the movable enclosure member 42, it is within the contemplation of this invention that the movable enclosure member may be moved by other means and responsive to other conditions. For example, the enclosure member 42 could be moved in response to changes in pressure instead of temperature and the pressure changes could easily be transmitted into the bellows 41 by a pipe or like means.

The upper boss 47 is exteriorly screw-threaded to receive a screw-threaded sleeve 50. A resilient disc member 51 which is rigidly secured to a valve disc 52 is adapted to be clamped between the screw-threaded sleeve 50 and the movable enclosure member 42 so that upon upward and downward movement of the movable enclosure member 42, the valve disc 52 will also be moved upwardly and downwardly. The valve disc 52 is adapted at certain times to engage the lower valve seat 16 of the port opening 14 and the resilient disc member 51, insures a good seating action. It will be noted at this point that the area of the bellows 41 is substantially the same as the area of the valve disc 52 whereby the inlet pressure acting on the valve disc 52 is balanced to prevent upward movement of the valve disc 52 by the inlet pressure acting thereon.

A second movable enclosure member located in the outlet chamber 13 is designated at 53 and it has a downwardly extending screw-threaded boss 54 which is adapted to be screwed into the screw-threaded sleeve 50. Since both of the movable enclosure members 42 and 53 are secured together by the sleeve 50, they must move in unison. A valve disc 55 adapted to engage at certain times with the upper valve seat 15 of the port opening 14 is clamped between the movable enclosure member 53 and the screw-threaded sleeve 50. The movable enclosure member 53 is also provided with an upwardly extending abutment boss 56 which has a slot 57 in the upper extremity thereof by means of which the movable enclosure member 53 may be screwed into the screw-threaded sleeve 50.

The lower end of a bellows 58 is secured to the movable enclosure member 53 in a fluid-tight manner and the upper end of the bellows 58 is also secured to a guide member 59 in a fluid tight manner. The bellows 58 is of substantially the same area as the upper valve disc 55 whereby the outlet pressure acting on the valve disc 55 is balanced to prevent downward movement of the valve disc 55 by the outlet pressure acting thereon.

The guide member 59 is provided with a flange 60 which overlies the casing 10 and the guide member 59 is held rigidly to the casing 10 by means of a cap member 61 being screw-threaded on the casing 10 and clamping therebetween the flange 60. The guide member 59 is provided interiorly thereof with a hexagonal opening which is adapted to receive a hexagonal nut 64 as shown clearly in Fig. 4. By reason of this hexagonal relationship, the nut 64 is permitted to move longitudinally in the guide member 59 but rotation thereof is prevented. A spring 65 is guided by and interposed between the hexagonal nut 64 and the movable enclosure member 53 to tend at all times to urge the movable enclosure member 53 in a downward direction. The spring 65 is adapted to resist the upward movement of the movable enclosure members by volatilization of the volatile fluid contained in the tube 29 or in the volatile fluid bulb 36. The hexagonal nut 64 is provided interiorly with screw-threads which are adapted to engage and coact with a screw 66 which has an upper extension 67 journalled for longitudinal and rotative movement in the cap member 61. The screw 66 also has a lower abutment extension 68 adapted at certain times to engage with the upper abutment boss 56 of the movable enclosure member 53. Secured to the abutment extension 68 by means of a pin 70 is a collar 69 which prevents excessive downward movement of the hexagonal nut 64 with respect to the screw 66.

By turning the screw 66, the hexagonal nut 64 is moved upwardly or downwardly to vary the tension in the spring 65 to determine at which condition or at which temperature the force of the volatile fluid will overcome the spring 65 to move the valves 52 and 55 with respect to their valve seats 16 and 15, respectively. Located between the cap member 61 and the upper surface of the screw 66 is a friction bearing device 71 to permit easy rotation of screw 66 with respect to the cap member 61.

Mounted above the cap member 61 by means of tongue arrangements 75 is a bridge 74. Spur gears 76 are mounted between the cap member 61 and the bridge 74 by means of rivets 77. Engaging and coacting with the spur gears 76 is an inner spur gear 78 which contains a key 81 adapted for sliding movement in a key slot 80 located in an extension 79 of the extension 67.

By reason of the elongated slot 80 and the key 81, relative rotation between the gear 78 and the extension 79 is prevented but longitudinal movement between these two members is permitted.

Rigidly secured to the bridge 74 is an upwardly extending guide member 83 upon which is mounted for rotation an actuator sleeve 84. The actuator sleeve 84 is rigidly secured to an annular cup-shaped member 85 which is in turn secured to an internal ring gear 87 by means of rivets 86. The internal ring gear 87 is adapted to engage and coact with the spur gears 76 thus forming a planetary gear system. Upon rotation of the actuator sleeve 84 and consequently the internal ring gear 87 in one direction, the inner spur gear 78 and consequently the screw 66 will be rotated in the opposite direction by reason of the planetary gear construction set out above.

The actuator sleeve 84 is secured against rotation with a strengthening member 89 by means of a key and slot arrangement 88 or some other like means. The strengthening member 89 is moulded into a composition handle 90 which handle is provided with a pointer 91. The strengthening member 89 and the handle 90 are held in engagement with the actuator sleeve 84 by means of a screw 97 having screw-threads 98 engageable with the guide member 83.

Enclosing the planetary gear system above described is a cover 93 which is secured to the cap member 61 by means of screws 94. Located on the upper surface of the cover 93 is a scale plate 95 which is held in place by means of rivets 96. The pointer 91 of the handle 90 coacts with the indications on the scale plate 95 to indicate the positions of the parts contained within the casing 10. The scale plate is clearly shown in Fig. 5.

As shown in Fig. 1, the valve 52 is in engagement with its valve seat 16 thereby preventing flow of fluid from the inlet chamber 12 to the outlet chamber 13. Upon a decrease in temperature acting on the tube 29 or the volatile fluid bulb 36, the volatile fluid contained therein will condense to decrease the pressure existing in the bellows 41 to permit expansion of the spring 65 to move the valve 52 away from its seat 16 to permit communication between the inlet chamber 12 and the outlet chamber 13. Excessive downward movement which would normally be caused by an excessive decrease in temperature is prevented by means of the downwardly extending boss 43 engaging the relatively strong spring 46. When the boss 43 so engages the spring 46, the valve discs 52 and 55 are equally spaced from their respective seats 16 and 15 to give maximum opening between the inlet chamber 12 and the outlet chamber 13. Upon an increase in temperature as determined by the tension in the spring 65, the volatile fluid in the tube 29 or in the bulb 36 will volatilize to create a pressure within bellows 41 to cause upward movement of valve disc 52 against its seat 16.

The position of the handle 90 as shown in Fig. 5 and designated "low temperature" corresponds to the position of the parts as shown in Fig. 1 wherein the spring 65 is in its longest adjustment to afford least resistance to upward movement of the valves 52 and 55. In such a position, only a relatively low temperature acting on the tube 29 or the bulb 36 is required to overcome the spring 65 to move the valve 52 to a closed position.

By turning the handle 90 in clockwise direction as viewed in Fig. 5 toward the warmer direction, the screw 66 will be turned in the opposite direction to cause downward movement of the hexagonal nut 64. This downward movement causes an increase in compression in the spring 65 whereby a greater volatile fluid force acting on the bellows 41 and consequently a higher temperature is required to overcome the spring 65 to move the valve disc 52 to its seat 16. When the handle 90, as viewed in Fig. 5, is so moved that the pointer 91 thereof falls along the "high temperature" line, the hexagonal nut 64 will be moved downwardly into engagement with the collar 69 to prevent further movement of the handle 90. When the hexagonal nut so engages the collar 69, the spring 65 is compressed its greatest amount thereby requiring the highest temperature acting on the tube 29 or the bulb 36 to move the valve 52 to its seat 16. From the above, it is seen that when the handle 90 is so positioned that the pointer 91 thereof is located between the "low temperature" indication and the "high temperature" indication automatic control of the valve is obtained and the valve will be opened and closed according to temperature changes acting on the tube 29 or the bulb 36 which temperature changes are determined by the position of the handle 90.

Assume now that the handle 90 is moved in a counter-clockwise direction from the position shown in Fig. 5, the screw 66 will be rotated in a clockwise direction. Clockwise movement of the screw 66 tends to cause upward movement of the hexagonal nut 64 but since the hexagonal nut 64 is in engagement with the bearing surface 71 upward movement thereof is prevented. Since the nut 64 cannot move upwardly, the screw 66 must move downwardly and this downward movement of the screw 66 is permitted by the elongated slot 80 which cooperates with the key 81 of the spur gear 78. Downward movement of the screw 66 causes the abutment extension 68 to engage the upper abutment boss 56 of the movable enclosure member 53 to cause downward movement thereof. Such downward movement moves the valve 55 towards its seat 15 and the valve 52 away from its seat 16.

When the handle 90 is so positioned that the pointer 91 thereof coincides with the "held open" indication of Fig. 5, the valves 55 and 52 will be moved downwardly to such an extent that they will be equally spaced from their respective seats 15 and 16. When the valves 55 and 52 are moved to this position, the lower boss 43 of the movable enclosure member 42 engages the spring 46 to resist downward movement beyond this point by the spring 65. In this manner, the valve as a whole is held in an open position and variations in temperature effecting the tube 29 or the bulb 36 will have no effect to move the valve as a whole out of this position.

Further counter-clockwise movement of the handle 90 will cause further clockwise movement of the screw 66 and further downward movement of the valves 55 and 52. When the handle 90 is rotated in a counter-clockwise direction sufficiently far so that the pointer 91 aligns with the "held closed" indication of Fig. 5, the valves 55 and 52 will be moved downwardly to such an extent that the valve 55 will engage the valve seat 15, such position being shown in Fig. 2. This further downward movement of the valves 55 and 52 is permitted by compressing the spring 46. When the valves are moved into this extreme downward position as shown in Fig. 2, the passage 14 between the inlet chamber 12 and the outlet chamber 13 is closed by the valve 55 engaging the valve seat 15 and when the parts are in this position the valve as a whole is held closed and any temperature variations effecting the tube 29 or the bulb 36 will have no effect to move the valve out of this position.

From the above, it is seen that we have invented a valve that is automatic in operation and that may be manually moved to a held open position or a held closed position and wherein a singel means is provided whereby the valve may be moved to a held open or a held closed position or whereby the temperature setting of the valve may be adjusted to cause automatic operation of the valve at various conditions or more specifically degrees of temperature.

It is obvious that many modifications may be apparent to those skilled in the art and consequently this invention is to be limited only by the scope of the appended claims and the prior art.

We claim as our invention:

1. In a valve of the class described, a pair of valve seats, a pair of valves adapted to move in unison and cooperating with said seats, means responsive to changes in a condition for moving said valves in one direction, resilient means for urging said valves in an opposite direction, manually operated means for adjusting the urging force of said resilient means, manually operated means for positively moving said valves in said opposite direction, and means for limiting movement of said valves in said opposite direction by said resilient means but allowing such movement by said last-mentioned manually operated means.

2. In a valve of the class described, a pair of valve seats, a pair of valves adapted to move in unison and cooperating with said seats, means responsive to changes in a condition for moving said valves in one direction, resilient means for urging said valves in an opposite direction, means for adjusting the urging force of said resilient means, means for positively moving said valves in said opposite direction, manually operated means for operating said last two mentioned means, and means for restricting movement of said valves in said opposite direction.

3. In a valve of the class described having an inlet chamber, an outlet chamber and a passage therebetween, aligned valve seats associated with said passage, aligned valves adapted to move in unison and to alternately engage said seats, means responsive to changes in a condition to move one of said valves against one of said seats, means resisting the movement of said condition responsive means, manually operated means for moving another of said valves against another of said seats, and means for preventing movement of the other of said valves against the other of said seats by said resisting means.

4. In a valve of the class described having an inlet chamber, an outlet chamber and a passage therebetween, aligned valve seats associated with said passage, aligned valves adapted to move in unison and to alternately engage said seats, means responsive to changes in a condition to move one of said valves against one of said seats, means resisting the movement of said condition responsive means, means for adjusting the resisting effort of said means, means for moving another of said valves against another of said seats, a manually operated means for operating said last two mentioned means, and means for preventing movement of the other of said valves against the other of said seats by said resisting means.

5. In a valve of the class described having an inlet chamber, an outlet chamber and a passage therebetween, a valve seat at each end of the passage and encircling the same, a valve structure adapted to engage alternately one seat or the other, a condition responsive means for moving said valve structure against one of said seats, biasing means for urging said valve structure away from said seat, manually operated means for moving said valve structure against the other of said seats, and means for preventing said biasing means from moving said valve structure against the other of said seats.

6. In a valve of the class described having an inlet chamber, an outlet chamber and a passage therebetween, a valve seat at each end of the passage and encircling the same, a valve structure adapted to engage alternately one seat or the other, a condition responsive means for moving said valve structure against one of said seats, biasing means for urging said valve structure away from said seat, manually operated means for adjusting said biasing means and for moving said valve structure against the other of said seats, and means for preventing said biasing means from moving said valve structure against the other of said seats.

7. In a valve of the class described having an inlet chamber, an outlet chamber and a passage therebetween, a valve seat at each end of said passage and encircling the same, a valve structure adapted to engage one seat or the other, a condition responsive device located in said inlet chamber and connected to said valve structure to move said valve structure against one of said seats and to balance the inlet pressure on said valve structure, biasing means engaging said valve structure to urge said valve structure away from said seat, means encompassing said biasing means and located in said outlet chamber to balance said outlet pressure on said valve structure, and means for preventing movement of the valve structure against the other of said seats by said biasing means.

8. In a valve of the class described, a bellows for urging said valve towards one position, resilient means for urging the valve towards another position, and means for preventing movement of said valve beyond an intermediate position by said resilient means upon rupture of the bellows.

9. In a valve of the class described having an inlet chamber, an outlet chamber and a passage therebetween, aligned valve seats associated with said passage, aligned valves adapted to move in unison and to alternately engage said seats, a bellows for moving one of said valves against one of said seats, means for resisting the movement of said bellows and for urging another of said valves against another of said seats, and means for preventing movement of said other valve against said other seat by said urging means upon rupture of said bellows.

10. An automatic valve comprising in combination, a valve casing having inlet and outlet passages separated by a partition having a valve port therein, a valve member cooperating with said valve port for controlling the flow of fluid from said inlet passage to said outlet passage, a condition responsive device for moving said valve member in a manner to vary the flow of fluid through said port in accordance with variations in the condition to which said device is responsive, adjusting means for positively moving said valve member to a predetermined position, and yieldable resisting means for limiting the range of movement of said valve by said condition responsive means while permitting full movement of said valve member by said adjusting means.

11. An automatic valve comprising in combination, a valve casing having inlet and outlet passages separated by a partition having a valve port therein, a pair of valve seats for said valve port, a valve structure cooperating with said valve port for controlling the flow of fluid from said inlet passage to said outlet passage, said valve structure being arranged for alternately engaging said valve seats, a condition responsive device for adjusting said valve structure in a manner to vary the flow of fluid through said port in accordance with variations in the condition to which said device is responsive, adjusting means for adjusting the condition responsive device and for moving positively said valve structure to a predetermined position independently of the operation of said condition responsive device, said adjusting means comprising a rotatable screw mounted in a manner normally to remain linearly stationary while being capable of linear movement, a nut threaded upon said screw, means for resisting rotation of said nut to cause linear travel thereof along said screw upon rotation of said screw, said nut being arranged to adjust said condition responsive means, an abutment member arranged to limit linear movement of said nut for causing linear travel of said screw when said nut is forced against said abutment, and means actuated by said linear travel of said screw for actuating positively said valve structure.

12. An automatic valve comprising in combination, a valve casing having inlet and outlet passages separated by a partition having a valve port therein, a pair of valve seats for said valve port, a valve structure cooperating with said valve port for controlling the flow of fluid from said inlet passage to said outlet passage, said valve structure being arranged for alternately engaging said valve seats, a condition responsive device for adjusting said valve structure in a manner to vary the flow of fluid through said port in accordance with variations in the condition to which said device is responsive, an adjustment member for adjusting said condition responsive device, and means actuated by said adjustment member when moved to predetermined positions for selectively and positively holding said valve structure so as to disengage both seats, or so as to engage one of said seats.

13. In a control device, in combination, a control member, a condition responsive device for moving said control member, and means for adjusting said condition responsive device and for also positively positioning said control member, said adjusting and positive positioning means comprising a pair of cooperating screw threaded members, one of said members being rotatable and mounted in a manner normally to remain linearly stationary while being capable of linear movement, means for restricting rotation of said other screw threaded member relatively to said first member to cause linear travel of said second mentioned screw threaded member upon rotation of said first member, and an abutment member arranged to limit linear movement of said second member for causing linear travel of said first member upon rotation of said first member when said second member is forced against said abutment.

14. An automatic valve comprising in combination, a valve casing having inlet and outlet passages separated by a partition having a valve port therein, a pair of valve seats for said port disposed on opposite sides thereof, a valve structure comprising a pair of spaced rigidly connected valve elements cooperating with said seats for controlling the flow of fluid from said inlet passage to said outlet passage, said valve structure being arranged for alternately engaging said seats, condition responsive means for adjusting said valve structure to vary the opening between said structure and one of said seats, means for preventing the engagement of the valve structure with the other one of said seats under the influence of the condition responsive means, and manual means for moving and positively holding the valve structure into engagement with said other seat.

15. An automatic valve comprising in combination, a valve casing having inlet and outlet passages separated by a partition having a valve port therein, a pair of valve seats for said port disposed on opposite sides thereof, a valve structure comprising a pair of spaced rigidly connected valve elements cooperating with said seats for controlling the flow of fluid from said inlet passage to said outlet passage, said valve structure being arranged for alternately engaging said seats, condition responsive means for adjusting said valve structure to vary the opening between said structure and one of said seats, means for preventing the engagement of the valve structure with the other one of said seats under the influence of the condition responsive means, and manual means for selectively holding the valve structure with both valve elements spaced from the valve seats or for positively holding one of the valve elements in engagement with said other seat.

16. In an automatic valve of the class described, a valve casing, valve means within said casing, said valve means being movable in one direction to gradually decrease the flow of fluid through said casing until the flow is entirely prevented, said valve means being movable in the other direction to gradually increase the flow of fluid through the casing, means for moving said valve means in accordance with variations in a variable condition, a resilient stop for limiting the movement of said valve means in said other direction under the influence of said condition responsive means at which time the flow through said casing will be at a maximum, resilient means opposing movement of said valve means in said first direction by said condition responsive means, and means operable by manual movement in a single direction for successively adjusting said resilient means, holding said valve means to permit fluid flow through said casing, and moving said valve means against the force exerted by said resilient stop to prevent the flow of fluid through said casing.

CHESTER A. RUDOLPH.
EDWIN C. McCUTCHEON.

CERTIFICATE OF CORRECTION.

Patent No. 2,151,050. March 21, 1939.

CHESTER A. RUDOLPH, ET AL.

It is hereby certified that error appears in the printed specification of the above numbered patent requiring correction as follows: Page 4, first column, line 46, claim 2, for the word "restricting" read resisting; and that the said Letters Patent should be read with this correction therein that the same may conform to the record of the case in the Patent Office.

Signed and sealed this 9th day of May, A. D. 1939.

(Seal)

Henry Van Arsdale
Acting Commissioner of Patents.